(12) United States Patent
Masubuchi et al.

(10) Patent No.: US 6,233,036 B1
(45) Date of Patent: May 15, 2001

(54) OPTICAL PRINTER

(75) Inventors: Sadao Masubuchi, Tokorozawa; Shinichi Nonaka, Tanashi, both of (JP)

(73) Assignee: Citizen Watch Co., Ltd., Tokyo (JP)

( * ) Notice: Subject to any disclaimer, the term of this patent is extended or adjusted under 35 U.S.C. 154(b) by 0 days.

(21) Appl. No.: 09/381,103

(22) PCT Filed: Jan. 10, 1999

(86) PCT No.: PCT/JP99/00132

§ 371 Date: Sep. 15, 1999

§ 102(e) Date: Sep. 15, 1999

(87) PCT Pub. No.: WO99/36268

PCT Pub. Date: Jul. 22, 1999

(30) Foreign Application Priority Data

Jan. 20, 1998 (JP) .................................................. 10-008396
Jan. 30, 1998 (JP) .................................................. 10-018918

(51) Int. Cl.[7] ........................... G03B 27/80; G03B 27/72; B41J 2/435; B41J 2/45; H04N 1/04
(52) U.S. Cl. ................................ 355/38; 355/35; 355/41; 347/232; 347/238; 347/239; 347/240; 347/255; 347/251; 358/474; 358/487; 358/497
(58) Field of Search .................................. 355/38, 35, 41; 347/232, 238, 239, 240, 255, 251, 252; 358/474, 487, 497

(56) References Cited

U.S. PATENT DOCUMENTS

| 5,032,911 | | 7/1991 | Takimoto . | |
|---|---|---|---|---|
| 5,321,431 | * | 6/1994 | Taikeno | 346/108 |
| 5,706,075 | * | 1/1998 | Ishikawa et al. | 355/35 |
| 5,936,708 | * | 8/1999 | Saita | 355/20 |

FOREIGN PATENT DOCUMENTS

| 62-85968 | 4/1987 | (JP) . |
|---|---|---|
| 62-261274 | 11/1987 | (JP) . |
| 2-169270 | 6/1990 | (JP) . |

* cited by examiner

Primary Examiner—Russell Adams
Assistant Examiner—Khaled Brown
(74) Attorney, Agent, or Firm—Smith, Gambrell & Russell, LLP (57) ABSTRACT

An optical printer apparatus exposes a sensitized sheet (500) to light from a light source (110), which is movable relatively to the sensitized sheet (500), with given timing in accordance with image data composed of pixels having a plurality of gradations that are linearly changeable from a minimum gradation of low color density to a maximum gradation of high color density. The distance for the exposure is adjusted for area gradation, whereby a gradated image is formed on the sensitized sheet (500). Further, change of the exposure distance, compared to change of the gradation, is not uniform throughout the range, and a non-linear relation is established between the changes.

20 Claims, 10 Drawing Sheets

OPTICAL PRINTER

TECHNICAL FIELD

The present invention relates to an optical printer apparatus having a scanning optical head capable of moving on a sensitized sheet to expose it with given timing, thereby forming an image, and more specifically, to a technique for controlling the exposure timing for the optical head to expose the sensitized sheet.

BACKGROUND ART

Disclosed in Japanese Patent Application Laid-Open No. 2-169270 is an optical printer apparatus in which an optical head is moved relative to a sensitized sheet to form an image on the sensitized sheet. This optical printer apparatus will now be described with reference to FIG. 9.

Figure 9:
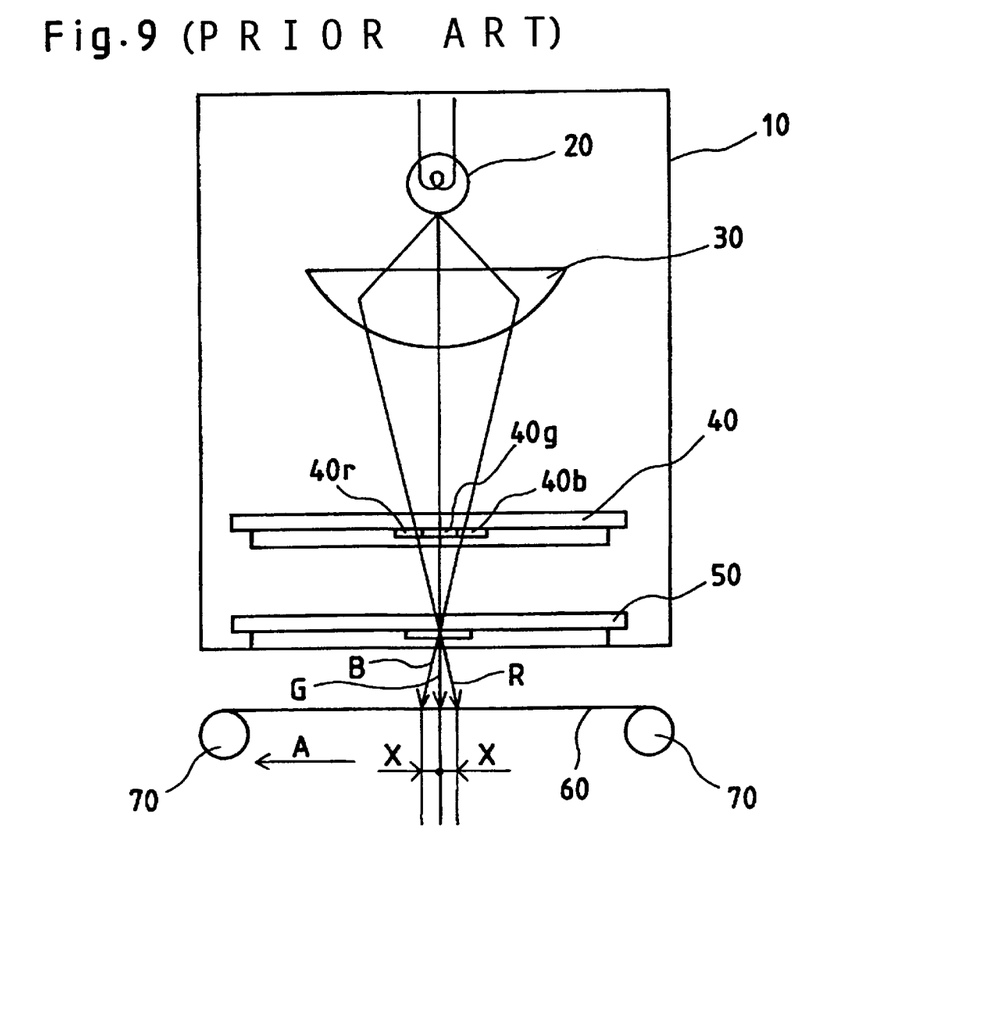
FIG. 9 is a schematic sectional view of a conventional optical printer apparatus.

A sensitized sheet 60 is driven at a constant speed in the direction of arrow A with respect to the optical head 10 by means of feed rollers 70. The optical head 10 comprises a white light source 20 for radially emitting white light, a cylindrical lens 30 for linearly converging the white light on the sensitized sheet 60, a three-color separation liquid crystal shutter 40, and a liquid crystal shutter 50.

The three-color separation liquid crystal shutter 40 is composed of three shutters 40r, 40g and 40b that linearly extend in the width direction (spreading direction) of the white light from the cylindrical lens 30. These three shutters 40r, 40g and 40b are driven independently of one another, and are provided individually with color filters that transmit red (R), green (G), and blue (B) light beams, respectively.

The liquid crystal shutter 50 includes a plurality of pixels that are arranged in the same direction as the lengthwise direction of the shutters 40r, 40g and 40b.

The following is a description of a method for forming an image on the sensitized sheet 60 by means of the apparatus shown in FIG. 9.

The optical printer apparatus receives gradated color image data, controls the shutters 40r, 40g and 40b in accordance with the image data, and exposes the surface of the sensitized sheet 60, thereby forming the image thereon. First, the shutter 40r opens for a given time to transmit the white light; next, the shutter 40g opens for the given time to transmit the white light; and then, the shutter 40b opens for the given time to transmit the white light.

This given time section is just equal to a period of time during which the sensitized sheet 60 moves for a distance X in FIG. 9.

Thus, the sensitized sheet 60 is exposed to the red light beam (R), which is first transmitted through the shutter 40r, for the distance X in its moving direction (direction A). Then, the shutter 40r is closed, while the shutter 40g opens. Since the sensitized sheet 60 is moved for the distance X by this time, that portion of the sensitized sheet 60 which is already exposed to the light beam R is exposed again to the green light beam (G) that is transmitted through the shutter 40g. When the sensitized sheet 60 further moves for the distance X, thereafter, the portion already exposed to the light beams R and G is exposed again in like manner to the blue light beam (B) that is transmitted through the shutter 40b. An image of full-color display can be obtained by repeating these processes of operation in the feeding direction of the sensitized sheet 60.

In a direction perpendicular to the feeding direction of the sensitized sheet 60, an image is formed by means of the liquid crystal shutter 50.

Figure 10:
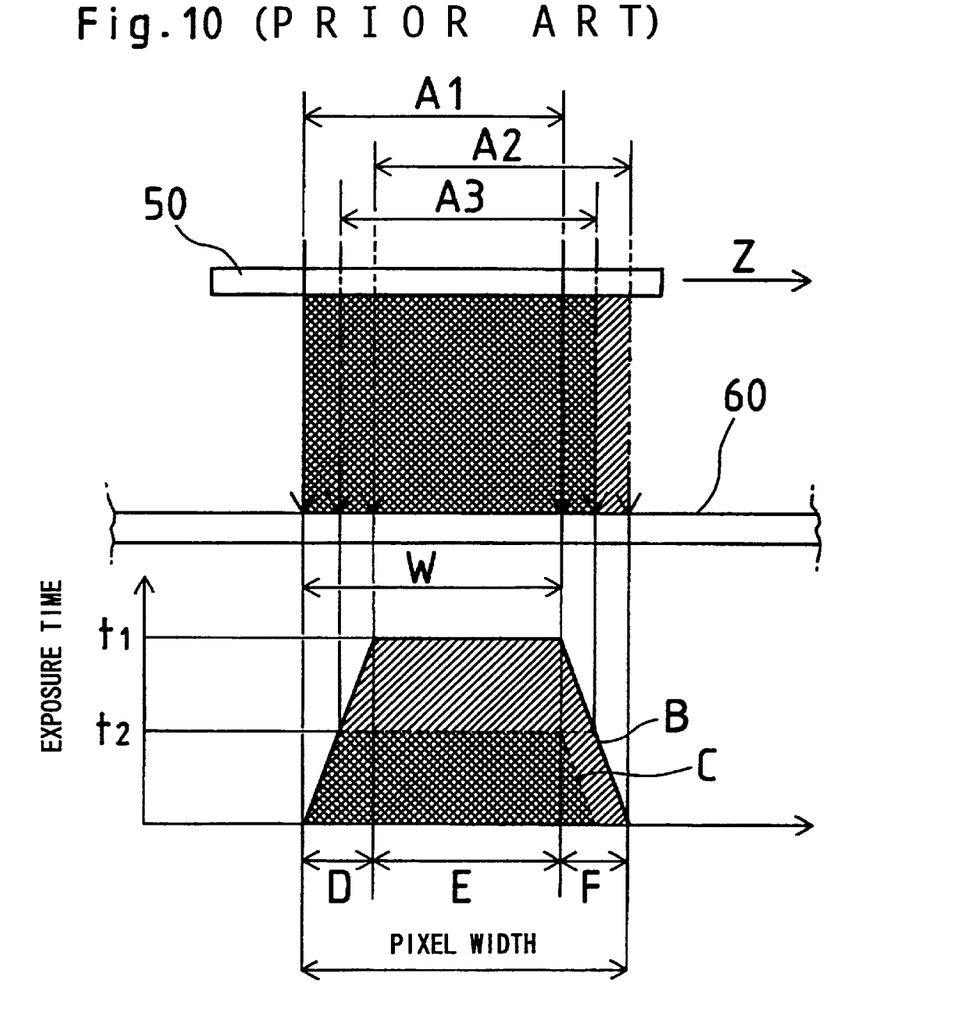
FIG. 10 is a diagram for illustrating exposure timing for the case where an image is formed by means of a conventional optical printer apparatus.

Referring now to FIG. 10, there will be described further in detail a method for gradation control by means of the printer apparatus shown in FIG. 9.

FIG. 10 is a diagram showing the relation between exposure time and position within the pixel width. For ease of illustration, in this case, the liquid crystal shutter 50 (and the optical head) is supposed to move in the z-direction with the sensitized sheet 60 kept stationary.

Let it be supposed that the light beam R with a width W, having passed through the liquid crystal shutter 50, is further moved at uniform speed in the z-direction so that an image A2 is formed after an image A1 is formed on the sensitized sheet 60.

Thereupon, the region that is exposed all the time from the formation of the image A1 on the sensitized sheet 60 to the formation of the image A2 is a region E within the pixel width. In this case, an exposure time t1 has a value obtained by dividing the distance for the movement of the image A1 to the image A2 (which is equal to the distance given by D and F in FIG. 10) by the moving speed of the optical head. In the regions D and F, moreover, the change of the exposure time, compared to the change of the z-direction position, is a linear increase or decrease. Thus, the relation between the position on the sensitized sheet 60 and the exposure time can be represented by a trapezoid B, as indicated by full line in FIG. 10.

When the light beam R with the width W, having passed through the liquid crystal shutter 50, is further moved in the z-direction so that an image A3 is formed after the image A1 is formed on the sensitized sheet 60, the relation between the position on the sensitized sheet 60 and the exposure time can be represented by a trapezoid C, as indicated by broken line in FIG. 10, if the distance for the movement of the image A1 to the image A3 is D/2.

The region that is exposed all the time from the formation of the image A1 on the sensitized sheet 60 to the formation of the image A3 corresponds to the top side of the trapezoid C indicated by broken line. In this case, the exposure time is t2 (=t1/2).

In the case where the gradation control is effected in a manner such that the light beam with the width W having passed through the liquid crystal shutter 50 is further moved in the z-direction to form the image A2 or A3 (or any other image) after forming the image A1 on the sensitized sheet 60, as described above, the trapezoid that is indicative of the relation between the position on the sensitized sheet 60 and the exposure time is always situated closer to one end (starting end) within the pixel width despite variation in height. Inevitably, therefore, there is a wide monochromatically exposed or unexposed portion in the region near the other end of the trapezoid. Accordingly, the image color mixture property is so poor that the image quality is lowered. Depending on the image pattern, moreover, interference fringes may be produced to make the image unclear in many cases.

The following problem is aroused, however, if the gradation control is effected in a manner such that the sensitized sheet 60 is exposed only for a time (t1, t2, etc.) corresponding to the given distance X by moving the image A1 on the sensitized sheet at uniform speed for the distance X in the scanning direction, as described above.

In general, the photosensitive properties of the sensitized sheet 60 with respect to time are non-linear. More specifically, the sensitization speed for the sensitized sheet is not always constant without regard to the exposure time. As the exposure time becomes longer, the sensitization speed lowers gradually.

Let it be supposed that the maximum exposure time is divided into N number of equal parts (N: integer), and image data i are made to correspond to [maximum exposure time×(i/N)] (i: an integer not larger than N). If the gradation is controlled by means of the image data i, the image data cannot be reproduced with correct gradation.

In general, moreover, the sensitization speed of the sensitized sheet 60 varies also depending on the waveform of light. Thus, in a color image, the gradation inevitably delicately varies with color without any change in exposure time.

DISCLOSURE OF THE INVENTION

The object of the present invention is to provide an optical printer apparatus, capable of forming a high-quality image with satisfactory color mixture property and of accurately reproducing the gradation of image data on a sensitized sheet to cope with the fact that the photosensitive properties of the sensitized sheet with respect to the exposure time are non-linear.

In order to achieve the above object, an embodiment of an optical printer apparatus according to the present invention comprises a light source movable relatively to a sensitized material and is arranged so that the sensitized material is exposed to light from the light source with given timing in accordance with image data composed of pixels having a plurality of gradations linearly changeable from a minimum gradation of low color density to a maximum gradation of high color density, and that the distance for the exposure is adjusted for area gradation, whereby a gradated image is formed on the sensitized material. And in the optical printer apparatus, change of the exposure distance is made to correspond non-linearly to change of the gradation.

Further, another embodiment of the optical printer apparatus according to the present invention comprises a light source for exposing a sensitized material and an optical shutter capable of selectively controlling the light from the light source so that the light is transmitted through or cut off from the sensitized material, and designed so that the light source and the optical shutter are moved relatively to the sensitized material to form an image on the sensitized material. The optical printer apparatus comprises storage means for storing gradated image data, nonlinear clock generating means for generating non-linear clock signals, counter means for counting the non-linear clock signals, and comparing means for comparing the output of the counter means and the contents of the storage means, wherein a gradated image is formed on the sensitized material by keeping the optical shutter open until the output of the counter means is coincident with the image data stored in the storage means.

BEST MODE FOR CARRYING OUT THE INVENTION

First, the principal part of an optical printer apparatus will be described with reference to FIGS. 1A and 1B.

An optical head 100 contains therein an optical system that is composed of a paraboloidal mirror 120, a cylindrical lens 130, and a reflector 140 as well as an LED array 110. The optical head 100 is driven in the direction of arrow z1 with respect to sensitized sheet 500 by means of head feeding means 300 (mentioned later).

The LED array 110 is composed of two rows of LED elements that emit red (R), green (G), and blue (B) light beams, each row including two LED elements. The LED elements for R, G and B are vertically arranged in the descending order on a photosensitive surface 500a of the sensitized sheet 500. Light beams emitted from the LED array 110 pass through the lower half of the cylindrical lens 130 and are reflected by the paraboloidal mirror 120, thus becoming parallel light beams. The parallel light beams reflected by the paraboloidal mirror 120 pass through the upper half of the cylindrical lens 130 and are reflected by the reflector 140. They then advances in the direction perpendicular to the photosensitive surface 500a of the sensitized sheet 500, pass through a liquid crystal shutter 150, and are focused on the photosensitive surface 500a. Thus, the focus of each light beam transmitted through the upper half of the cylindrical lens 130 is located on the photosensitive surface 500a of the sensitized sheet 500.

The liquid crystal shutter 150 includes one scanning electrode and 640 signal electrodes, whereby 640 pixels are formed in a line in the width direction (direction indicated by arrow z2 in FIG. 1A) of the sensitized sheet 500.

The head feeding means 300 includes an endless optical head scanning wire 373, pulleys 371 and 372 wound with the scanning wire 373, and a DC motor 310 for rotating the pulley 371. A part of the scanning wire 373 is fixed to a wire fixing portion 111 that protrudes from a side face of the optical head 100.

A fin 321 of a rotary encoder 320 is mounted on the rotating shaft of the DC motor 310. A large number of apertures 322 are formed in the fin 321. A light emitting element and a light receiving element (not shown) of a photo-interrupter 323 face each other with the fin 321 between them. The fin 321 and the photo-interrupter 323 constitute the rotary encoder 320.

The fin 321 rotates simultaneously with the DC motor 310. As the fin 321 rotates, the apertures 322 allow intermittent transfer of the light beams between the light emitting and receiving elements of the photo-interrupter 323. An electrical signal is outputted in synchronism with this intermittent transfer of the light beams, whereupon the rotational angular position of the DC motor 310 is detected.

Figure 1A:
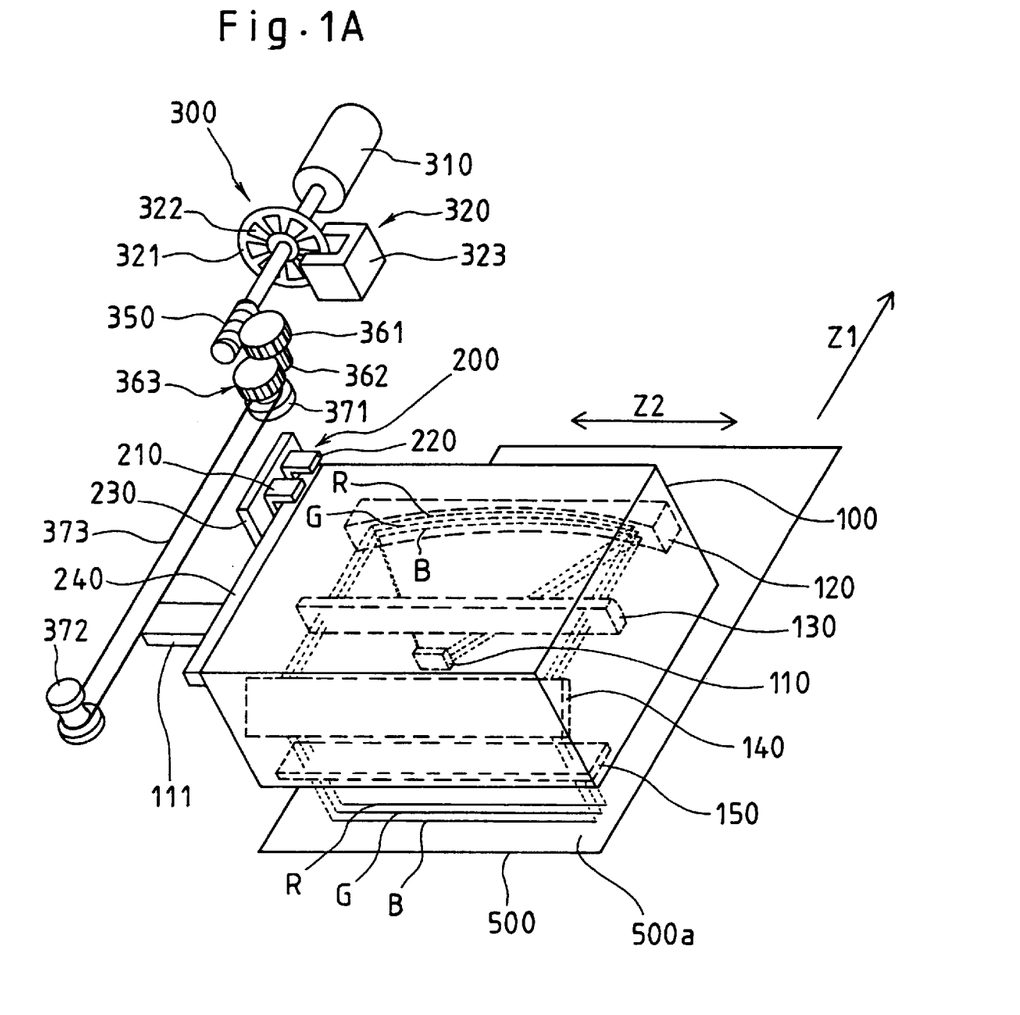
FIG. 1A is a perspective view showing an outline of an optical printer apparatus according to the present invention.

As shown in FIG. 1A, the rotation of the DC motor 310 is decelerated by means of a worm gear 350 and gears 361, 362 and 363, and is converted into a linear reciprocation by means of the pulleys 371 and 372 and the scanning wire 373. The reciprocation of the scanning wire 373 causes the wire fixing portion 111 to move the optical head 100 in its scanning direction.

A pair of position sensors 210 and 220, formed of a photo-interrupter each, are fixed to a substrate 230 of the optical printer apparatus. When a douser 240 that is fixed to the optical head 100 moves together with the optical head 100 in the scanning direction, one or both of the position sensors 210 and 220 are screened from light, whereupon the position of the optical head 100 is detected.

Figure 1B:
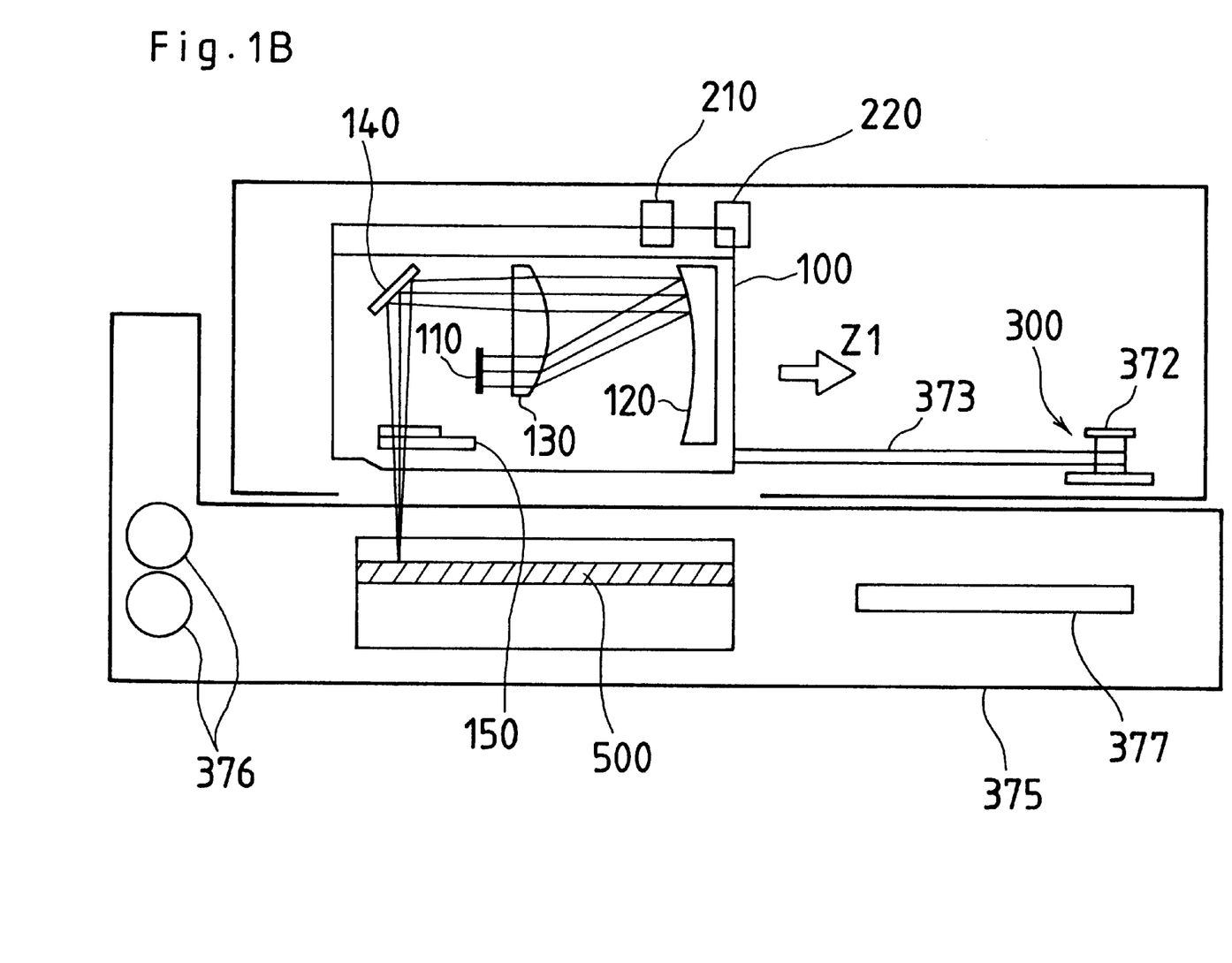
FIG. 1B is a schematic view of the optical printer apparatus of FIG. 1A.

In FIG. 1B, reference numeral 375 denotes a base plate of the optical printer apparatus. The base plate 375 contains therein the sensitized sheet 500, a developing roller 376, a control circuit 377, etc.

The following is a description of a method for forming an image on the sensitized sheet 500.

The LED array 110 emits red, green, and blue light beams in the descending order. The light beams from the LED array 110 spread in the transverse direction (direction indicated by arrow z2 in FIG. 1A) as they pass through the lower half of the cylindrical lens 130 and reach the paraboloidal mirror 120. The light beams reflected by the paraboloidal mirror 120 and spread in the transverse direction are converted into parallel light beams, and pass through the upper half of the cylindrical lens 130. The upper half of the cylindrical lens 130 serves to converge the light beams reflected by the paraboloidal mirror 120 and form an image with a given width on the plane of the sensitized sheet 500.

The light beams converged by the upper half of the cylindrical lens 130 are made to change their courses substantially at 90 degrees by the flat reflector 140, and start to advance in the direction perpendicular to the plane of the sensitized sheet 500. Then, the light beams pass through the liquid crystal shutter 150, and the sensitized sheet 500 is exposed to them.

The light beams focused with the given width on the sensitized sheet 500 are arranged rearward in the order of R, G and B from front to back in the scanning direction (direction z1), as shown in FIG. 1A.

When the optical head 100 is fed at a given speed in the scanning direction (direction of arrow z1) by the head feeding means 300, the douser 111 intercepts both light beams from the photo-interrupters 210 and 220. Thereupon, it is concluded that the optical head 100 is in its write start position, and writing is started.

The following is a description of basic operation for writing.

First, the light beam R passes for a first time that is controlled by means of the liquid crystal shutter 150, whereby a predetermined region of the sensitized sheet 500 is exposed. Then, the light beam G passes for a second time that is controlled by means of the liquid crystal shutter 150, whereby that region is exposed. Further, the light beam B passes for a third time that is controlled by means of the liquid crystal shutter 150, whereby the same region is exposed. Thus, a full-color image is formed on the aforesaid region.

These light beams of the three colors, R, G and B are expected to be applied accurately to a predetermined position on the sensitized sheet 500 in accordance with image data. Accordingly, the emission timing of the LED array 110 and the open-close timing of the liquid crystal shutter 150 are synchronized with the output of the rotary encoder 320 that is mounted on the rotating shaft of DC motor 310.

The timing for the exposure of the sensitized sheet 500 will now be described with reference to FIGS. 2 and 3.

The optical head (not shown in FIGS. 2 and 3) moves at the given speed in the direction of arrow z with respect to the sensitized sheet 500 as it radiates the light beams R, G and B having a width W each toward the sensitized sheet 500.

Figure 2:
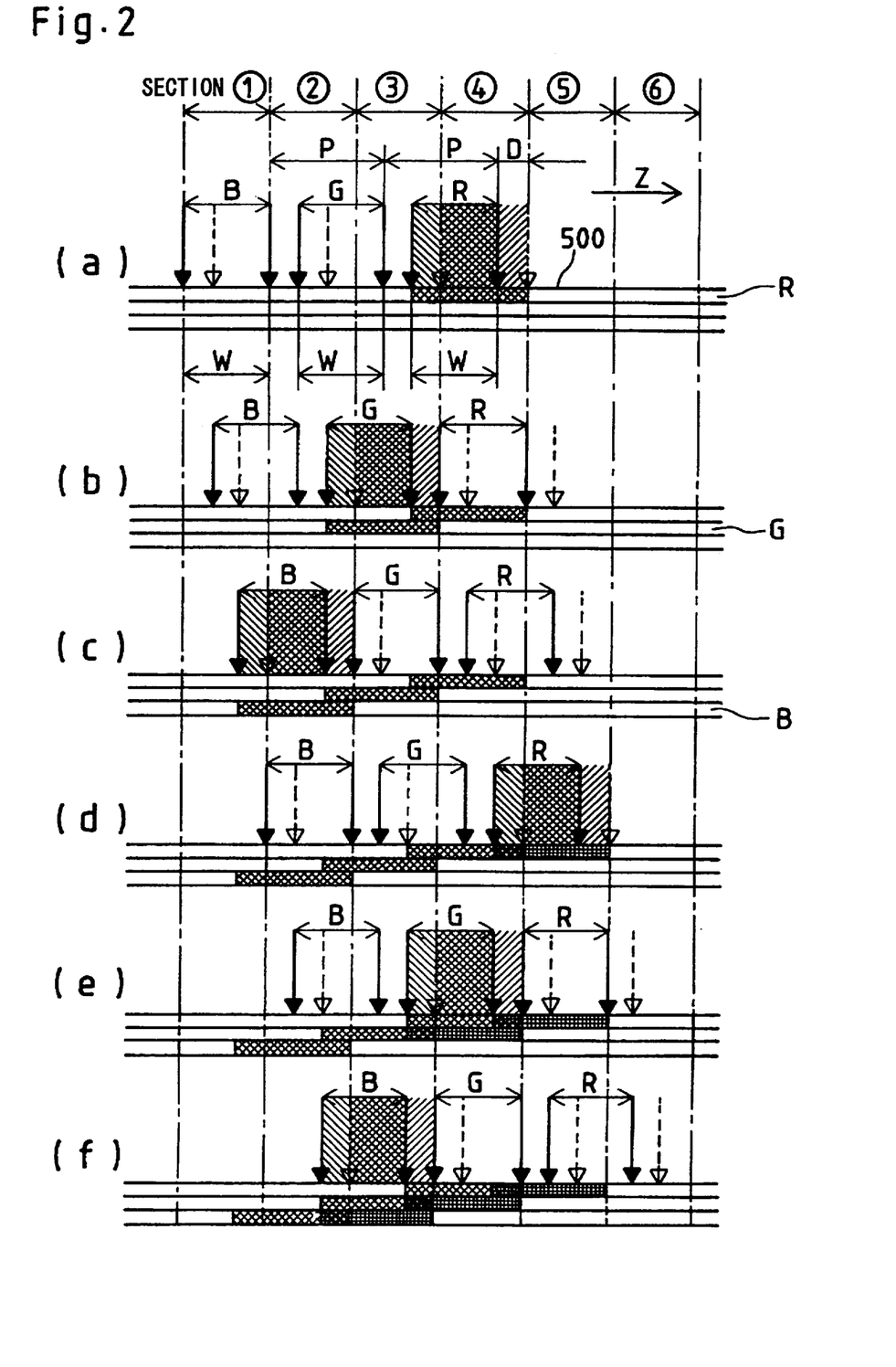
FIG. 2 is a diagram for illustrating exposure timing for forming an image by means of the optical printer apparatus according to the present invention, showing first and second exposure cycles.

Item (a) of FIG. 2 shows the way the light beam R continues to irradiate a region ④ for a time during which the light beam moves from the position indicated by two full lines spaced W apart to the position indicated by two dotted lines spaced W apart, that is, for a time during which the light beam moves distance D. A double-hatched region is a portion that continues to be exposed during the whole time the optical head is moving the distance D.

Since the optical head moves at constant speed, the distance D corresponds to the exposure time. If the distance D is a maximum exposure distance, therefore, that region of the sensitized sheet 500 where two types of hatching overlap each other in (a) of FIG. 2 may be concluded to have been exposed to the light beam R for a maximum exposure time. In other words, this region (4 is given R of a maximum gradation.

Figure 3:
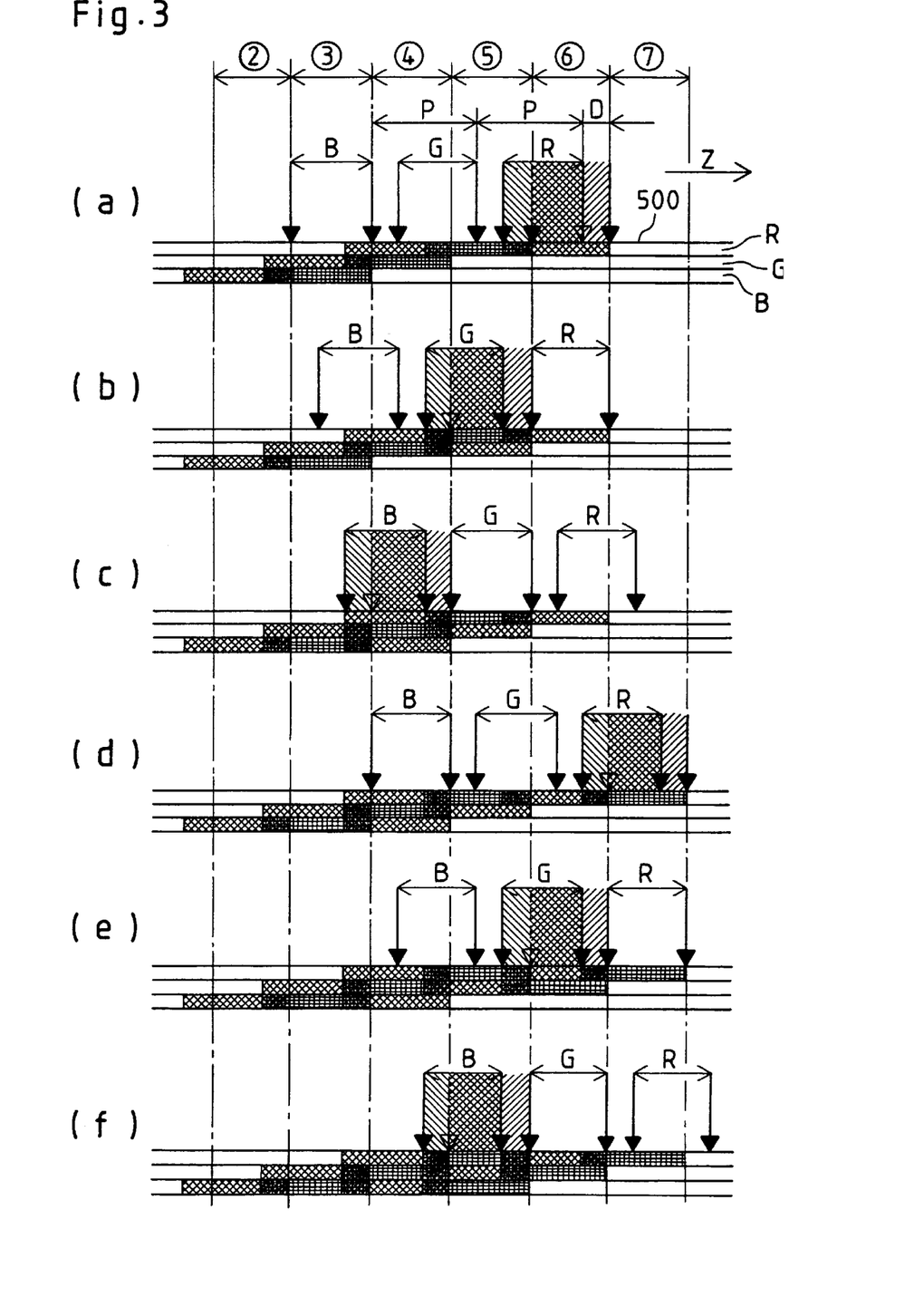
FIG. 3 is a diagram for illustrating exposure timing for forming the image by means of the optical printer apparatus according to the present invention, showing third and fourth exposure cycles.

In FIGS. 2 and 3, the sensitized sheet 500 is divided into three layers for convenience, in order to indicate the color, R, G or B, of the light beam to which the sheet is exposed. Exposure to the light beam R is represented by the hatching on the first layer from the top, exposure to the light beam G by the hatching on the second layer from the top, and exposure to the light beam B by the hatching on the third layer from the top.

As mentioned before, the light beams R, G and B are focused to form images with the width W each on the sensitized sheet 500.

Further, distances P (image pitches P) in the z-direction (scanning direction) are kept individually between the image of the light beam B with the width W and the image of the light beam G with the width W and between the image of the light beam G with the width W and the image of the light beam R with the width W.

Referring now to FIGS. 2 and 3, there will be described the way individual sections are exposed to the light beams R, G and B. Sections ① to ② shown in FIGS. 2 and 3 individually represent pixels in the scanning direction of the optical head.

First, the exposure timing for a first exposure cycle will be described with reference to (a) to (c) of FIG. 2.

(a) Exposure of Section ④ to Light Beam R:

As shown in (a) of FIG. 2, the light beam R is radiated, and the section ④ starts to be exposed thereto, as indicated by two full-line arrows. Then, the spot of exposure is moved for a given exposure distance in the z-direction, and the exposure is finished in a position indicated by two dotted-line arrows. As the light beam R is applied, only a sensitizing agent reacting to the light beam R, applied to the sensitized sheet 500, is exposed. In (a), the region that is irradiated with the light beam R is represented by hatching the first layer from the top of the sensitized sheet 500. Since this exposure distance is indicative of exposure for a time corresponding to the distance, as mentioned before, it determines the degree of gradation of the light beam R. Thus, the gradation is controlled in accordance with this exposure distance.

(b) Exposure of Section ③ to Light Beam G:

The moment the radiation of the light beam R is finished, as shown in (b) of FIG. 2, the light beam G is radiated, and the section ③ starts to be exposed thereto, as indicated by two full-line arrows.

Then, the spot of exposure is moved for the given exposure distance in the z-direction, and the exposure is finished at a position indicated by two dotted-line arrows. As the light beam G is applied, only a sensitizing agent reacting to the light beam G, applied to the sensitized sheet 500, is exposed. In (b) of FIG. 2, the region that is irradiated with the light beam G is represented by hatching the second layer from the top of the sensitized sheet 500.

As mentioned before, this exposure distance determines the gradation of the light beam G.

(c) Exposure of Section ② to Light Beam B:

The moment the radiation of the light beam G is finished, as shown in (c) of FIG. 2, the light beam R is radiated, and the section ② starts to be exposed thereto, as indicated by two full-line arrows.

Then, the light beam R is moved for the given exposure distance in the z-direction, and the exposure is finished at a position indicated by two dotted-line arrows. As the light beam B is applied, only a sensitizing agent reacting to the light beam B, applied to the sensitized sheet 500, is exposed. In (c) of FIG. 2, the region that is irradiated with the light beam B is represented by hatching the third layer from the top of the sensitized sheet 500. As mentioned before, this exposure distance determines the gradation of the light beam G.

As described above, one cycle of emission of R, G and B shown in (a) to (c) of FIG. 2 constitutes one exposure cycle. This exposure cycle is repeated many times to expose the sensitized sheet 500, whereupon a full-color image is formed on the surface of the sensitized sheet 500.

During one exposure cycle, different sections on the sensitized sheet 500 are exposed to the light beams R, G and B, individually. In one exposure cycle shown in (a) to (c) of FIG. 2, the sections ④, ③ and ② are exposed to the light beams R, G and B, respectively. Since the gradation is controlled by controlling the distance (i.e., radiation time) for radiative movement in each section, a gradated image can be formed.

The exposure timing for a second exposure cycle will now be described with reference to (d) to (f) of FIG. 2.

(d) As shown in (d) of FIG. 2, the section ⑤ starts to be exposed to the light beam R from a position indicated by two full-line arrows, and the light beam R is moved entire for a given exposure distance in the z-direction, whereupon the exposure is finished in a position indicated by two dotted-line arrows.

(e) As shown in (e) of FIG. 2, the section ④ starts to be exposed to the light beam G from a position indicated by two full-line arrows, and the light beam G is moved entirety for a given exposure distance in the z-direction, whereupon the exposure is finished in a position indicated by two dotted-line arrows. At this point of time, the section ④ can be concluded to have been doubly exposed to the light beams R and G.

(f) As shown in (f) of FIG. 2, the section ③ starts to be exposed to the light beam B from a position indicated by two full-line arrows, and the light beam B is moved entirety for a given exposure distance in the z-direction, whereupon the exposure is finished in a position indicated by two dotted-line arrows. At this point of time, the section ③ can be concluded to have been doubly exposed to the light beams G and B.

The exposure timing for a third exposure cycle will now be described with reference to (a) to (c) of FIG. 3.

(g) As shown in (a) of FIG. 3, the section ⑥ starts to be exposed to the light beam R from a position indicated by two full-line arrows, and the light beam R is moved entirety for a given exposure distance in the z-direction, whereupon the exposure is finished in a position indicated by two dotted-line arrows.

(h) As shown in (b) of FIG. 3, the section ⑤ starts to be exposed to the light beam G from a position indicated by two full-line arrows, and the light beam G is moved entire for a given exposure distance in the z-direction, whereupon the exposure is finished in a position indicated by two dotted-line arrows. At this point of time, the section ⑤ can be concluded to have been doubly exposed to the light beams R and G.

(i) As shown in (c) of FIG. 2, the section ④ starts to be exposed to the light beam B from a position indicated by two full-line arrows, and the light beam B is moved entirety for a given exposure distance in the z-direction, whereupon the exposure is finished in a position indicated by two dotted-line arrows. At this point of time, the section ④ can be concluded to have been doubly exposed to the light beams G and B.

The exposure timing for a fourth exposure cycle will now be described with reference to (d) to (i) of FIG. 3.

(j) As shown in (d) of FIG. 3, the section ⑦ starts to be exposed to the light beam R from a position indicated by two full-line arrows, and the light beam R is moved entirety for a given exposure distance in the z-direction, whereupon the exposure is finished in a position indicated by two dotted-line arrows.

(k) As shown in (e) of FIG. 3, the section ⑥ starts to be exposed to the light beam G from a position indicated by two full-line arrows, and the light beam G is moved entirety for a given exposure distance in the z-direction, whereupon the exposure is finished in a position indicated by two dotted-line arrows. At this point of time, the section ⑥ can be concluded to have been doubly exposed to the light beams R and G.

(l) As shown in (f) of FIG. 2, the section ⑤ starts to be exposed to the light beam B from a position indicated by two full-line arrows, and the light beam B is moved entirety for a given exposure distance in the z-direction, whereupon the exposure is finished in a position indicated by two dotted-line arrows. At this point of time, the section ⑤ can be concluded for the first time to have been exposed to all the light beams of the different colors, the light beams R, G and B.

The principle of gradation control for the optical printer apparatus will now be described with reference to FIG. 4.

Figure 4:
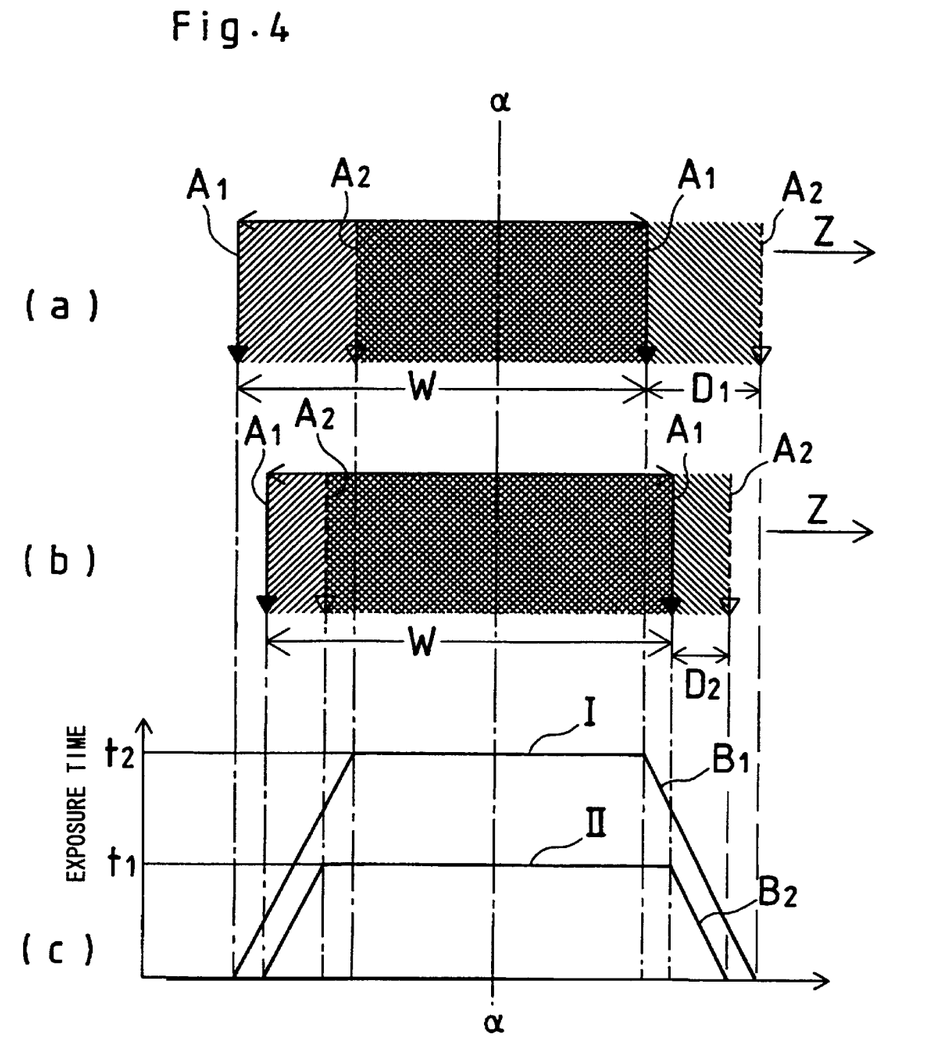
FIG. 4 is a diagram for illustrating the principle of gradation control for the optical printer apparatus according to the present invention.

FIG. 4 shows the relationship between the exposure distance on the sensitized sheet and the exposure time.

In FIG. 4, (a) indicates that exposure to a light beam with the width W is started in a position indicated by full lines A1—A1, the light beam moves entirety at uniform speed for a distance D1 in the z-direction (scanning direction), and the exposure is finished in a position indicated by dotted lines A2—A2.

A double-hatched portion shown in (a) of FIG. 4 (i.e., portion surrounded by the left-hand line A2 and the righthand line A1) is a region that is exposed all the time from the start of exposure to the end of exposure. The exposure time for this region is equal to a time t2 that is obtained by dividing the distance D1 by the moving speed. The exposure time with respect to the z-direction position on the drawing plane has the form of a trapezoid B1, as shown in (c) of FIG. 4.

In FIG. 4, (b) indicates that exposure to a light beam of width W is started in a position indicated by full lines A1—A1, the light beam moves entire at uniform speed for a distance D2(=D½) in the z-direction (scanning direction), and the exposure is finished in a position indicated by dotted lines A2—A2.

A double-hatched portion shown in (b) of FIG. 4 is a region that is exposed all the time from the start of exposure to the end of exposure. The exposure time for this region is equal to a time t2(=t½) that is obtained by dividing the distance D2 by the moving speed. The exposure time with respect to the z-direction position on the drawing plane has the form of a trapezoid B2, as shown in (c) of FIG. 4.

As seen from FIG. 4, the scanning-direction center of the region that continues to be exposed all the time from the start of exposure to the end of exposure is coincident with a pixel center a in either of the case (a) where only the exposure distance D1 is covered by the exposure and case (b) where only the exposure distance D2 is covered by the exposure. Thus, the scanning-direction center of the region that continues to be exposed all the time from the start of exposure to the end of exposure never changes even if the exposure distance varies. Further, the exposure time, that is, the degree of gradation, can be changed by varying the exposure distance.

A specific example of a circuit for the aforesaid gradation control will now be described with reference to FIGS. 5 to 7.

Referring first to the block diagram of FIG. 5, there will be described a control system for the optical printer apparatus shown in FIG. 1A. In FIG. 5, for component parts identical with those explained with reference to FIG. 1A, the same reference numerals are used, and a description of those parts is omitted.

As mentioned before, the optical head 100 is moved at constant speed in the scanning direction by the head feeding means 300, and forms an image on the sensitized sheet 500 by exposing the sensitized sheet 500 for a given period of time. In FIG. 5, the optical head 100 drawn by full line is in an exposure start position (write start position), while the optical head 100 drawn by dotted line is in an exposure end position (write end position).

The outputs of the position sensors 210 and 220 for detecting the position of the optical head are applied to the input of a decoder 600. The decoder 600 outputs an active pulse only when both the position sensors 210 and 220 are switched on, when one position sensor 210 is switched on with the other position sensor 220 off, or when one position sensor 210 is switched off with the other position sensor 220 on.

Figure 5:
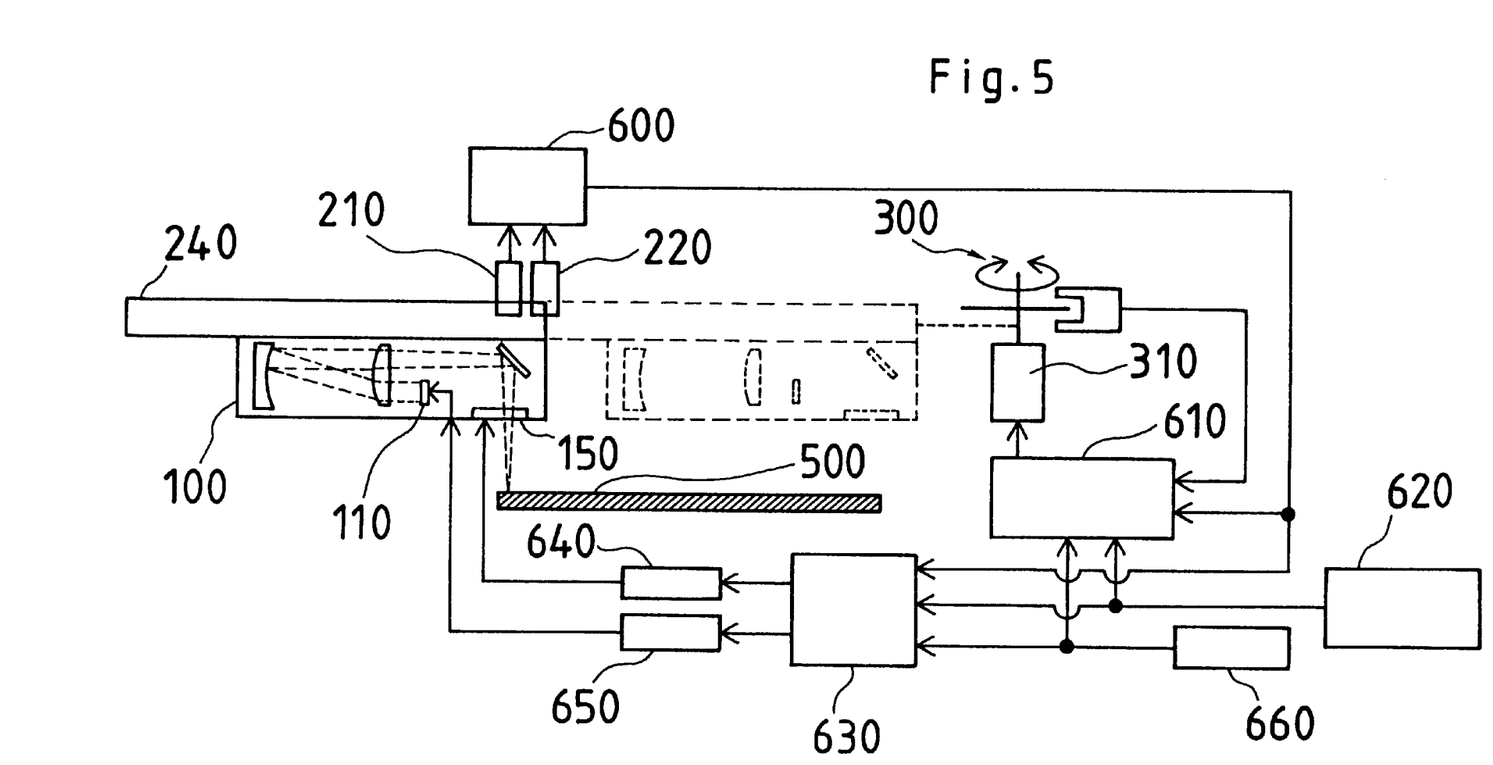
FIG. 5 shows a block diagram of the optical printer apparatus shown in FIG. 1.

In FIG. 5, reference numeral 610 denotes a motor drive circuit that has a PLL circuit therein. Reference numeral 620 denotes a controller, which is a personal computer, usually.

Reference numeral 630 denotes a counter. Reference numeral 640 denotes a liquid crystal shutter driver for driving the liquid crystal shutter 150 with given timing. Reference numeral 650 denotes an LED driver for driving the LED array 110 with given timing. And, reference numeral 660 denotes a reference clock.

When the optical head 100, moved at uniform speed on the sensitized sheet 500 by the head feeding means 300 (shown in detail in FIG. 1A), reaches a write position, both the position sensors 210 and 220 are switched on. The decoder 600 detects the activation of both the position sensors 210 and 220, and delivers a write start signal to the liquid crystal shutter driver 640 and the LED driver 650 through the counter 630.

The speed of the optical head 100 is controlled with high accuracy by PLL control by means of the rotary encoder 320 (see FIG. 1A) and the PLL circuit 610. Since the emission timing of the LED array 110 is also synchronized with the output of the rotary encoder 320, a very accurate image can be obtained.

When the optical head 100 is moved to a position indicated by dotted line in the drawing, the position sensor 210 is switched off, and the decoder 600 outputs a write end signal, whereupon writing the image data is finished.

Gradation control for the image data will now be described with reference to the block diagram of FIG. 6 that shows a control system for the liquid crystal shutter 150. The image data are composed of pixels having a plurality of gradations that linearly change from a minimum gradation at low color density to a maximum gradation at high color density.

The liquid crystal shutter 150 includes one common electrode N and 640 signal electrodes S1 to S640, which are arranged to oppose to one another in a matrix with a liquid crystal material between them. An LCD driver 700 applies liquid crystal driving voltage to the signal electrodes S1 to S640 in accordance with the image data. Since there is only one common electrode N, no AC drive is effected in particular.

The image data, which are 8-bit data, are delivered to the LCD driver 700. The delivered image data are successively stored in 640 shift registers SR1 to SR640 in the LCD driver 700 in synchronism with clocks SRCK for shift registers. Thus, one-pixel image data has $2^8$=256 gradations for each of the light beams R, G and B.

Figure 6:
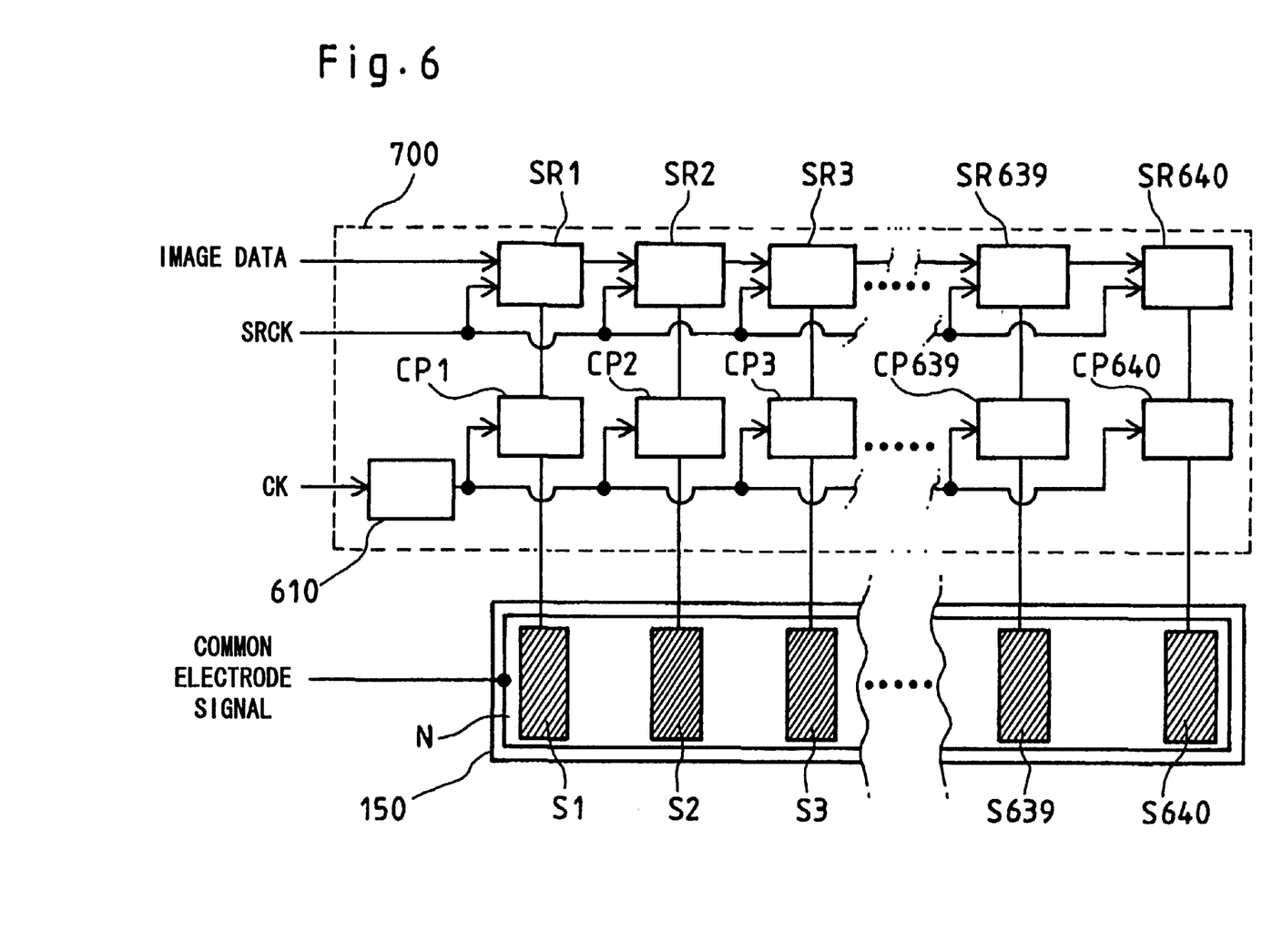
FIG. 6 shows a block diagram of a control system for a liquid crystal shutter of the optical printer apparatus according to the present invention.
Figure 7:
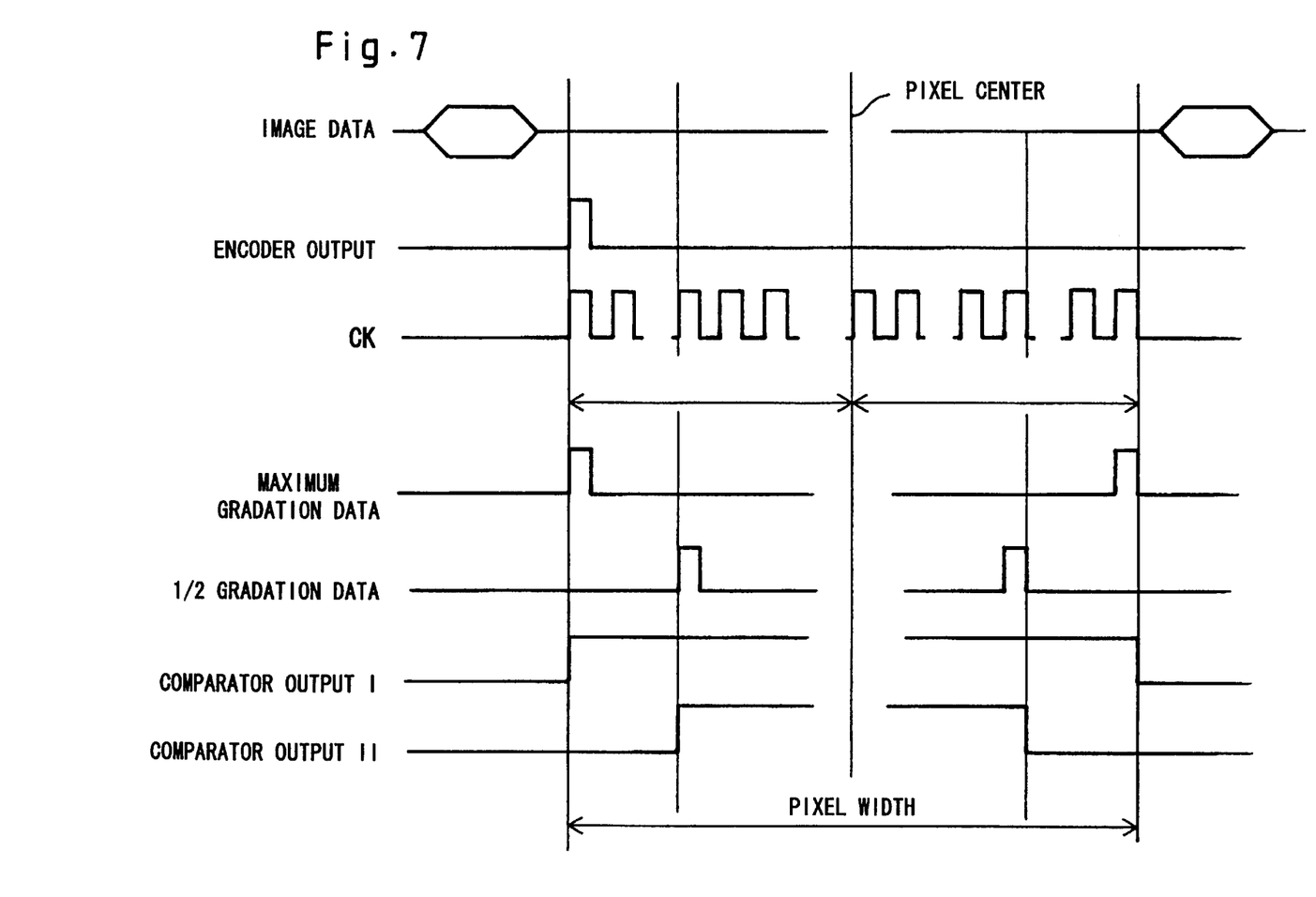
FIG. 7 shows a time chart for the block diagram of FIG. 6.

Referring now to FIG. 6 and the time chart of FIG. 7, there will be described in detail a method for controlling the liquid crystal shutter 150 in accordance with 8-bit gradation data (number of gradations) and making each pixels to display 256 gradations.

The image data are delivered to the shift registers SR1 to SR640. The shift registers SR1 to SR640 deliver the gradation data in the image data stored therein to comparators CP1 to CP640, individually.

When the rotary encoder 320 (FIG. 1A) delivers an output corresponding to the starting end position of the pixels, entry of gradation control clocks CK into an up-down counter 610 is started. The pixel starting end position may be also detected by synchronization with a basic clock pulse without using any rotary encoder.

The up-down counter 610 counts the gradation control clocks CK, and delivers the resulting value to the comparators CP1 to CP640.

The comparators CP1 to CP640 compare the gradation data from the shift registers SR1 to SR640 with a value in the counter 610 in an up-counting mode. If coincidence between the values is detected, a driving signal for the liquid crystal shutter 150 is switched from low level to high level. The gradation control clocks CK include 511 pulses in total. The timing is adjusted so that the position of the pixel center is reached when the 256th pulse enters the counter 610 in the up-counting mode.

Having up-counted from 1 to 256, the up-down counter 610 then down-counts from the 257th pulse. Thus, when the 511 pulses of the gradation control clocks CK are entered, the output of the up-down counter 610 changes in the order of 1, 2, 3, . . . 255, 256, 255, 254, . . . 3,2,1.

When the comparators CP1 to CP640 detect another coincidence of the gradation data with the output of the up-down counter 610 (i.e., in a down-counting mode), it switches the driving signal for the liquid crystal shutter from high level to low level.

Figure 8:
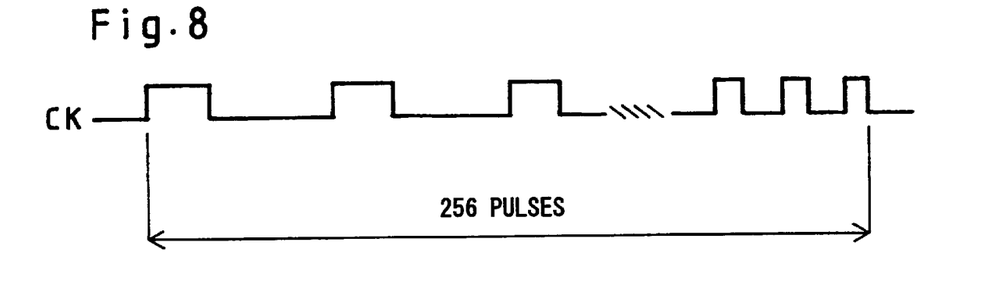
FIG. 8 is a waveform diagram showing clock pulses applied to a liquid crystal shutter control system shown in FIG. 7.

The pulse spacing (pulse period) of the 511 gradation control clocks CK is not uniform from first to last, and is changed in conformity to the photosensitive properties of the sensitized sheet 500 to be used. For example, the pulses shown in FIG. 8 are used in the case where the sensitized sheet used has photosensitive properties such that the sensitization speed is high at the time immediately after the start of exposure and gradually lowers with the passage of time thereafter. More specifically, in the process of proceeding from the first to 256th pulse, the pulse spacing is gradually narrowed, while in the process of proceeding from the middle or 257th pulse to the last or 511th pulse, the pulse spacing is gradually widened.

The pulse spacing of the gradation control clocks CK is adjusted by means of the controller 620 (personal computer). More specifically, numeric values are inputted by means of keys of the computer in accordance with the properties of the sensitized sheet used.

In the case where the sensitization speed of the sensitized sheet used gradually increases with time, in contrast with the case of FIG. 8, in the process of proceeding from the first to 256th pulse, the pulse spacing is gradually widened, while in the process of proceeding from the middle or 257th pulse to the last or 511th pulse the spacing is gradually widened.

In either case, the change of the pulse spacing for the first to 256th pulses and the change of the pulse spacing for the 257th to 511th pulses are bisymmetrical with respect to the 256th pulse in the center.

Thus, the relation between the value of the gradation data in the image data and the exposure time (period of time during which the driving signal for the liquid crystal shutter 150 is in high level) which depends on the value of the gradation data is a non-linear relation, corresponding to the temporally non-linear photosensitive properties of the sensitized sheet used. In consequence, the relation between the value of the inputted gradation data and the gradation realized on the sensitized sheet is linear.

According to the present invention, as described above, the temporal non-linearity of the photosensitive properties of the sensitized sheet used is canceled by adjusting the pulse spacing of the gradation control clocks CK. By doing this, a linear relation is established between the value of the gradation data and the gradation on the sensitized sheet. Thus, the way of adjusting the pulse spacing of the gradation control clocks CK is settled depending on the temporal non-linearity of the photosensitive properties of the sensitized sheet used.

When the gradation is maximum, 1 is given to the gradation data. Thereupon, the output of the corresponding comparator becomes high level when the counter output in the up-counting mode is 1 and becomes low level when the counter output in the down-counting mode is 1 (see "COMPARATOR OUTPUT I" of FIG. 7).

When the gradation is ½, on the other hand, 128 is given to the gradation data. Thereupon, the output of the corresponding comparator becomes high level when the counter output in the up-counting mode is 128 and becomes low level when the counter output in the down-counting mode is 128 (see "COMPARATOR OUTPUT II" of FIG. 7). As mentioned before, however, the pulse spacings of the gradation control clocks are not uniform throughout the time (exposure time) during which the driving signal for the liquid crystal shutter 150 is in high level. Therefore, the exposure time for this case is not exactly equal to ½ of the exposure time for the maximum gradation, but is longer or shorter.

Whether the gradation is maximum or ½ (or at any other value), the center position of the region where the outputs of the comparators CP1 to CP640 (i.e., driving signal for the liquid crystal shutter 150) are in high level is coincident with the pixel center.

According to the present invention, the optical printer apparatus is designed so that the exposure time for the liquid crystal shutter may correspond non-linearly to the change of the gradation data in the image data. Even in the case where a sensitized material of which sensitization speed lowers with time is used, therefore, the exposure time can be changed to correct this photosensitive property, so that a uniform clear image can be obtained.

Further, for making an exposure time to correspond nonlinearly to the change of the gradation data, the variation of the exposure time can be freely set. Thus, properties peculiar to the apparatus can be tackled, and a clear image can be obtained.

Since the exposure distance for gradation display is changed with respect to the pixel center, moreover, a high-quality image with satisfactory color mixture property can be obtained. Furthermore, fringes and the like that are produced depending on the image pattern can be canceled.

What is claimed is:

1. An optical printer apparatus, which comprises a light source movable relative to a sensitized material and arranged so that said sensitized material is exposed to light from said light source, said light source moving a distance during exposure, for a given time, in accordance with image data composed of pixels having a plurality of gradations linearly changeable from a minimum gradation of low color density to a maximum gradation of high color density, and so that the distance for the exposure is adjusted for area gradation, wherein, in operation of the optical printer apparatus, a gradated image is formed on said sensitized material, and change of the exposure distance is made to correspond non-linearly to change of said gradation.

2. An optical printer apparatus according to claim 1, wherein said exposure time is adapted to lengthen as the gradation changes from the minimum value to the maximum value.

3. An optical printer apparatus according to claim 1, wherein said exposure time is adapted to shorten as the gradation changes from the minimum value to the maximum value.

4. An optical printer apparatus according to claim 1, wherein the change of said exposure distance is controlled to be substantially symmetrical with respect to the center of a maximum exposure distance for the maximum gradation.

5. An optical printer apparatus according to claim 4, wherein the center of said maximum exposure distance is substantially coincident with the center of said pixels.

6. An optical printer apparatus according to claim 1, wherein the light from said light source is controlled by means of a liquid crystal shutter to form an image on said sensitized material.

7. An optical printer apparatus according to claim 6, wherein the light for exposure is composed of a substantially red light beam, R, a substantially green light beam, G, and a substantially blue light beam, B, and the change of the exposure distance is made to correspond non-linearly to the change of the gradation for each light beam.

8. An optical printer apparatus according to claim 1, which further comprises an optical shutter capable of selectively controlling the light from the light source so that the light is transmitted through or cut off from said sensitized material, and is designed so that said optical shutter is moved relative to said sensitized material to form an image on said sensitized material;
- storage means for storing gradated image data;
- non-linear clock generating means for generating non-linear clock signals;
- counter means for counting the non-linear clock signals; and
- comparing means for comparing the output of the counter means and the contents of said storage means,
- wherein, in operation of the optical printer apparatus, the gradated image is formed on said sensitized material by keeping said optical shutter open until the output of the counter means is coincident with the image data stored in said storage means.

9. An optical printer apparatus according to claim 8, wherein the period of the clock signals from said clock means for gradation control changes with time.

10. An optical printer apparatus according to claim 9, wherein the period of the clock signals from said clock generating means for gradation control changes non-linearly with time.

11. An optical printer apparatus according to claim 9, wherein the period of the clock signals from said clock generating means for gradation control increases non-linearly with time.

12. An optical printer apparatus according to claim 9, wherein the period of the clock signals from said clock generating means for gradation control lessens non-linearly with time.

13. An optical printer apparatus according to claim 9, wherein said light source is composed of three colors, R, G and B.

14. An optical printer apparatus according to claim 13, wherein said clock generating means for gradation control is provided independently for R gradation control, G gradation control, and B gradation control.

15. An optical printer apparatus according to claim 14, wherein said clock generating means for gradation control is constructed so that the pulse spacing thereof can be set to any value.

16. An optical printer apparatus according to claim 15, wherein said optical shutter is composed of a liquid crystal shutter, and the image is formed on said sensitized material by line operation.

17. An optical printer apparatus according to claim 1, further comprising:
- an optical shutter located between the light source and the sensitized material and adapted to allow or cut off the passage of light from the light source;
- image data storage means for storing gradated image data as an integer i;
- pixel position detecting means for detecting the starting end position of pixels;
- pulse generating means for gradation control adapted to generate a number of pulses N on receiving an input signal;
- a counter adapted to start counting the pulses generated by the pulse generating means for gradation control on receiving a signal from the pixel position detecting means; and
- optical shutter open-close control means adapted to receive the gradation image data i stored in the image data storage means and the count output of the counter, apply an open signal to the optical shutter when i number of pulses are counted by the counter, and apply a close signal to the optical shutter when (N−i) number of clocks are counted.

18. An optical printer apparatus according to claim 17, wherein said counter up-counts for first to (N/2)-th pulses and down-counts for subsequent pulses ended by an N-th pulse.

19. An optical printer apparatus according to claim 17, wherein said clock generating means generates the first to (N/2)-th pulses at gradually narrowing intervals and generates the subsequent pulses ended by the N-th pulse at gradually widening intervals.

20. An optical printer apparatus according to claim 17, wherein said clock generating means generates the first to (N/2)-th pulses at gradually widening intervals and generates the subsequent pulses ended by the N-th pulse at gradually narrowing intervals.

* * * * *